United States Patent
Azevedo et al.

(10) Patent No.: US 10,690,247 B2
(45) Date of Patent: Jun. 23, 2020

(54) GALLERYLESS SHORT COMPRESSION INSULATED STEEL PISTON

(71) Applicant: FEDERAL-MOGUL LLC, Southfield, MI (US)

(72) Inventors: Miguel Azevedo, Ann Arbor, MI (US); Greg Salenbien, Britton, MI (US); Andrew Stockwell, Saline, MI (US)

(73) Assignee: Tenneco Inc., Lake Forest, IL (US)

( * ) Notice: Subject to any disclaimer, the term of this patent is extended or adjusted under 35 U.S.C. 154(b) by 104 days.

(21) Appl. No.: 15/866,121

(22) Filed: Jan. 9, 2018

(65) Prior Publication Data

US 2018/0195610 A1 Jul. 12, 2018

Related U.S. Application Data

(60) Provisional application No. 62/444,721, filed on Jan. 10, 2017.

(51) Int. Cl.
*F16J 1/18* (2006.01)
*F02F 3/00* (2006.01)
(Continued)

(52) U.S. Cl.
CPC .............. *F16J 1/18* (2013.01); *F02F 3/003* (2013.01); *F02F 3/0023* (2013.01);
(Continued)

(58) Field of Classification Search
CPC ............ F02F 2003/0007; F02F 3/0076; F02F 3/0092; F02F 3/12; F02F 3/14;
(Continued)

(56) References Cited

U.S. PATENT DOCUMENTS

| 968,213 A | 8/1910 | Welcome |
| 1,427,673 A | 8/1922 | Allen |

(Continued)

FOREIGN PATENT DOCUMENTS

| DE | 2620910 A1 | 11/1976 |
| EP | 1039111 A2 | 9/2000 |

(Continued)

OTHER PUBLICATIONS

International Search Report, dated Apr. 9, 2018 (PCT/US2018/013042).

*Primary Examiner* — Thomas E Lazo
*Assistant Examiner* — Dustin T Nguyen
(74) *Attorney, Agent, or Firm* — Robert L. Stearns; Dickinson Wright PLLC (57) ABSTRACT

A steel piston for coupling to a connecting rod and wrist pin is provided. The piston includes a body with an upper crown presenting a combustion surface for exposure to a combustion chamber. The upper crown presents an undercrown surface which is openly exposed as viewed from an underside of the piston and not bounded by a cooling gallery. The body includes a ring belt and pin bosses depending from the ring belt and presenting a pin bore for receiving the wrist pin. The body also includes ribs disposed along the undercrown surface. The body includes a ratio of compression height to outer diameter (CH/D) ranging from 34.8% to 42.0%. The piston also includes a low heat transfer coating on the combustion surface, and the low heat transfer coating has a thermal conductivity of about 0.20 to 0.80 W/m·K.

20 Claims, 11 Drawing Sheets

(51) Int. Cl.
*F02F 3/12* (2006.01)
*F16J 1/08* (2006.01)
*F02F 3/22* (2006.01)

(52) U.S. Cl.
CPC .............. *F02F 3/0069* (2013.01); *F02F 3/12* (2013.01); *F16J 1/08* (2013.01); *F02F 3/0076* (2013.01); *F02F 3/22* (2013.01); *F02F 2003/0007* (2013.01)

(58) Field of Classification Search
CPC ........ F16J 1/001; F16J 1/01; F16J 1/14; F16J 1/16; F16J 1/18
USPC .......... 92/172, 208, 209, 222, 223, 238, 239
See application file for complete search history.

(56) References Cited

U.S. PATENT DOCUMENTS

| | | | |
|---|---|---|---|
| 2,978,360 A | 4/1961 | Bradstreet et al. | |
| 3,019,277 A | 1/1962 | Rudy | |
| 4,013,057 A | 3/1977 | Guenther | |
| 4,074,671 A * | 2/1978 | Pennila | F02B 77/02 |
| | | | 123/668 |
| 4,502,422 A * | 3/1985 | Brann | F01P 3/08 |
| | | | 123/193.6 |
| 4,646,707 A | 3/1987 | Pfefferle | |
| 4,694,813 A * | 9/1987 | Mielke | F02F 3/12 |
| | | | 123/193.6 |
| 4,773,368 A | 9/1988 | Pfefferle | |
| 4,811,707 A | 3/1989 | Pfefferle | |
| 4,819,595 A * | 4/1989 | Pfefferle | F02B 51/02 |
| | | | 123/272 |
| 5,072,654 A | 12/1991 | MacGregor | |
| 6,158,413 A | 12/2000 | Kimura et al. | |
| 6,571,684 B1 | 6/2003 | Nov et al. | |
| 7,527,048 B2 | 5/2009 | Gillston et al. | |
| 8,286,606 B2 | 10/2012 | Breidenbach et al. | |
| 8,807,109 B2 * | 8/2014 | Muscas | F02F 3/003 |
| | | | 123/193.6 |
| 9,004,037 B2 | 4/2015 | Muscas | |
| 9,103,441 B2 | 8/2015 | Azevedo et al. | |
| 9,243,709 B2 | 1/2016 | Lapp et al. | |
| 2003/0084858 A1 | 5/2003 | Kracklauer | |
| 2007/0084449 A1 * | 4/2007 | Najt | F01L 3/04 |
| | | | 123/668 |
| 2009/0188464 A1 | 7/2009 | Dettori et al. | |
| 2012/0037112 A1 | 2/2012 | Muscas | |
| 2014/0238232 A1 | 8/2014 | Lapp et al. | |
| 2014/0352650 A1 | 12/2014 | Muscas et al. | |
| 2015/0204269 A1 | 7/2015 | Hiratsuka et al. | |
| 2016/0123273 A1 | 5/2016 | Scharp et al. | |
| 2016/0131075 A1 | 5/2016 | Lapp et al. | |
| 2016/0138516 A1 | 5/2016 | Moding | |
| 2016/0186686 A1 | 6/2016 | Azevedo et al. | |
| 2017/0184052 A1 * | 6/2017 | Lineton | B29C 43/18 |

FOREIGN PATENT DOCUMENTS

| | | |
|---|---|---|
| EP | 2085598 A2 | 8/2009 |
| JP | H1150857 A | 2/1999 |
| WO | 2015072945 A1 | 5/2015 |

* cited by examiner

Table A
BREAKDOWN OF OEM, AMPS AND SKI  DD15

| Feature | Units | MSTEEL XS839F27 | AMPS G1 X6216F07 | AMPS G3 X6216F17 | AMPS G4 (5KI) X...... |
|---|---|---|---|---|---|
| | | 1 | 2 | 3 | 4 |
| Diameter | mm | 139.0 | 139.0 | 139.0 | 139.0 |
| Comp. Height | mm | 81.5 | 58.5 | 58.5 | 50.4 |
| Ch/φ | % | 58.6 | 42.1 | 42.1 | 36.3 |
| Normalized Ch | | 1.00 | 0.72 | 0.72 | 0.62 |
| Piston Weight | g | 3932.0 | 3237.0 | 3091.0 | 2818.0 |
| Apparent Weight | g/cm$^3$ | 1.46 | 1.21 | 1.15 | 1.05 |
| Normalized App. Weight | | 1.00 | 0.82 | 0.79 | 0.72 |
| Connecting Rod L | mm | 278.00 | 301.00 | 301.00 | 309.00 |
| Connecting Rod Weight | g | 5402.50 | 5497.5 | 5497.5 | 5545.5 |

GALLERYLESS SHORT COMPRESSION INSULATED STEEL PISTON

CROSS REFERENCE TO RELATED APPLICATION

This U.S. utility patent application claims priority to U.S. provisional patent application No. 62/444,721, filed Jan. 10, 2017, the contents of which is incorporated herein by reference in its entirety.

BACKGROUND OF THE INVENTION

1. Technical Field

This invention relates generally to pistons for internal combustion engines, including steel pistons for diesel engines, and methods of manufacturing the pistons.

2. Related Art

Steel pistons of various designs are used in diesel combustion engines. To accommodate combustion pressures and thermal loads, diesel engines are bulky by design. The engine design parameters affecting internal and external proportions of the engine are combustion bore diameters, spacing between adjacent cylinders which is dictated by cylinder type, stroke, compression height of the pistons, and center-to-center length of connecting rods, among others. Typically, if all other design parameters are kept constant, pistons with high compression height values, i.e. a compression height/diameter ratio of about 0.8, are dynamically difficult to stabilize because a high percentage of the mass of the piston is above the center of pivoting, which is along a pin bore axis of the piston. During translation of the piston, i.e. the sideways motion of the piston inside the cylinder, the piston instability generates impacts on the cylinder liner, referred to as piston slap. The piston slap is perceived as airborne noise, which can be disturbing, especially during cold start conditions. Under engine running conditions, the piston slap can cause cavitation of coolant and thus collapsing bubbles, which can lead to erosion of the cylinder liner surface.

The connecting rod length can also contribute to the noise if the angularity of the rod is too high, for example due to a short connecting rod. However, if the connecting rod is longer, the negative effects are minimized, and friction by the thrust force generated is also reduced. However, a longer connecting rod inevitably is heavier and larger at its small end, which in turn may force the use of a piston having a higher compression height. Bulkiness could also result from the need to dampen impulse noise generated by diesel combustion, referred to as diesel knock. At and above 6 bar per crank angle degree pressure rise rate, airborne noise becomes very objectionable. The pressure rise results mostly from the pre-mixed fuel injected since the start of injection.

SUMMARY OF THE INVENTION

One aspect of the invention provides a galleryless steel piston capable of providing reduced piston slap for use with an improved connecting rod design, and thus a smoother and quieter running engine. The piston also has a simplified design that provides solutions to the above noted power cylinder unit problems. The galleryless steel piston includes a low heat transfer coating along an upper crown of the piston to provide a lower temperature along a ring belt and undercrown surface, and ribs extending along the undercrown surface to maintain rigidity. The galleryless steel piston also has a reduced compression height which contributes to reduced mass of the piston and thus the smoother, quieter running engine.

Another aspect of the invention provides a method of manufacturing the galleryless steel piston. The method includes providing a galleryless steel piston with an upper crown, ribs extending along an undercrown surface, and a reduced compression height. The method also includes applying a low heat transfer coating along the upper crown of the piston.

Yet another aspect of the invention provides a system for an internal combustion engine including a connecting rod and galleryless steel piston coupled to a wrist pin. The galleryless steel piston has a reduced compression height and includes a low heat transfer coating along an upper crown of the piston to provide a lower temperature along a ring belt and undercrown surface, and ribs extending along the undercrown surface to maintain rigidity. The system provides for an increase in waste heat recovery and improved engine efficiency, for example an increase in thermal brake efficiency of 7% to 15%.

BRIEF DESCRIPTION OF THE DRAWINGS

These and other aspects, features and advantages of the invention will become more readily appreciated when considered in connection with the following detailed description and accompanying drawings, in which.

DETAILED DESCRIPTION OF EXAMPLE EMBODIMENTS

Figure 1:
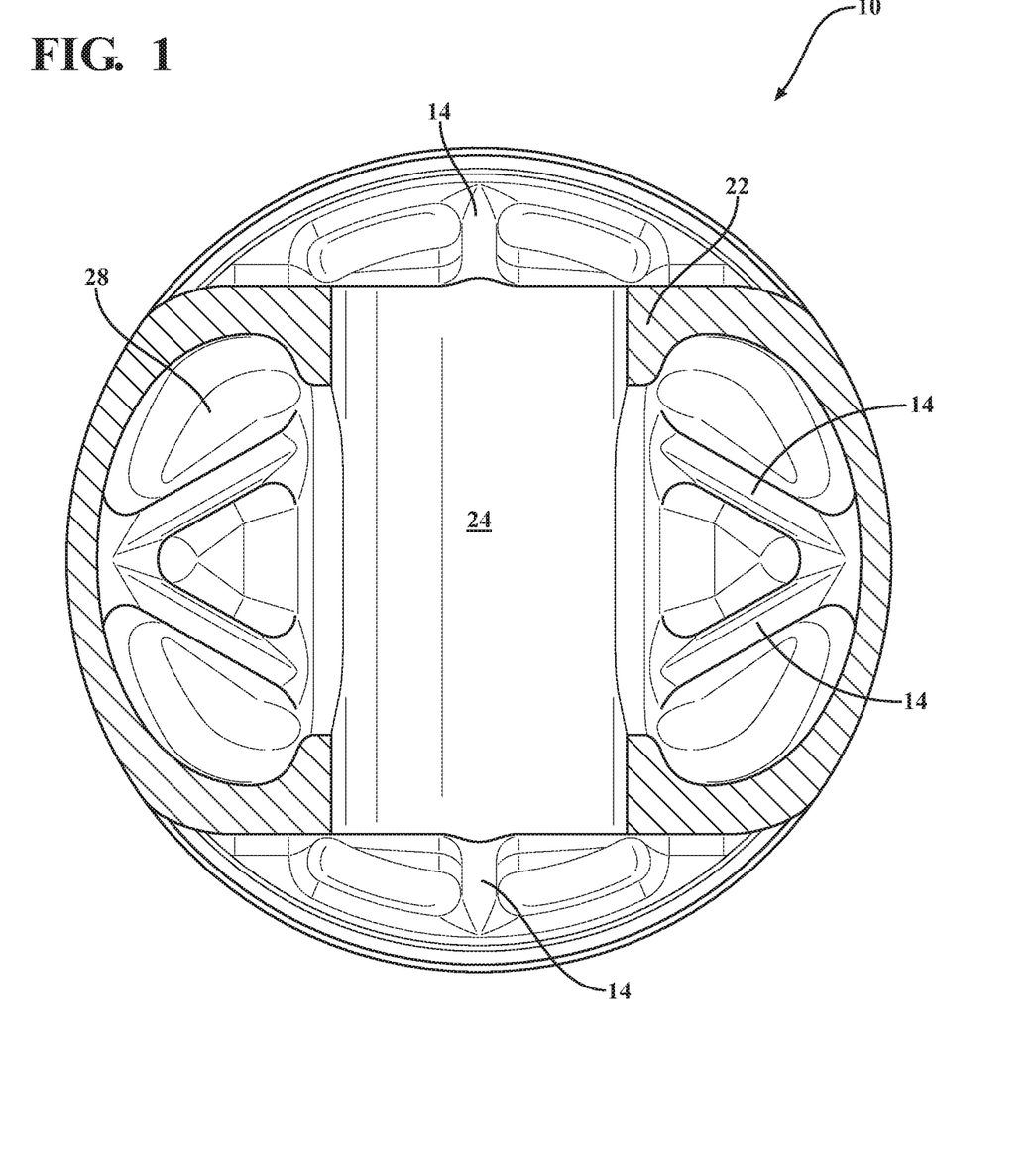
FIG. 1 is a bottom view of a galleryless steel piston according to an example embodiment of the invention.
Figure 2A:
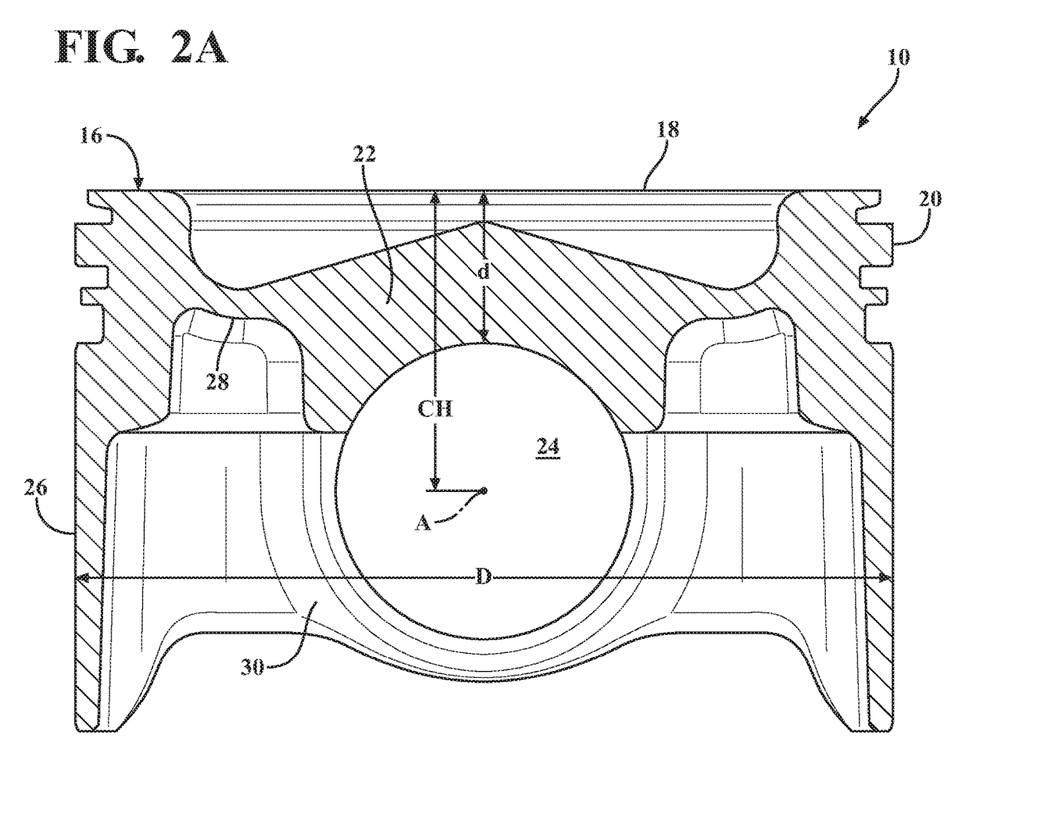
FIG. 2A is a side cross-sectional view of a galleryless steel piston according to another example embodiment of the invention.
Figure 2B:
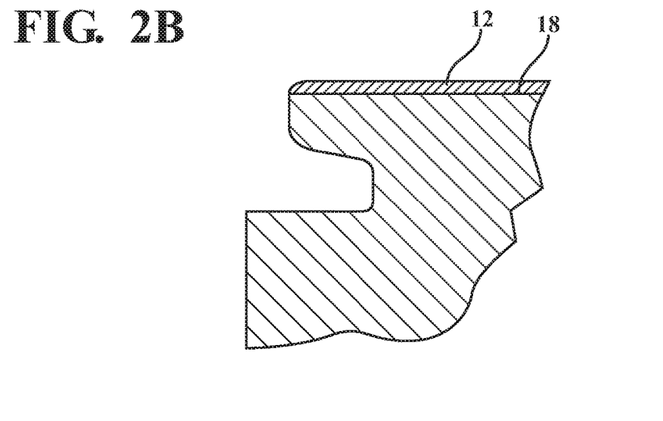
FIG. 2B is a portion of the piston of FIG. 2A showing a low heat transfer coating applied to a combustion surface.
Figure 5A:
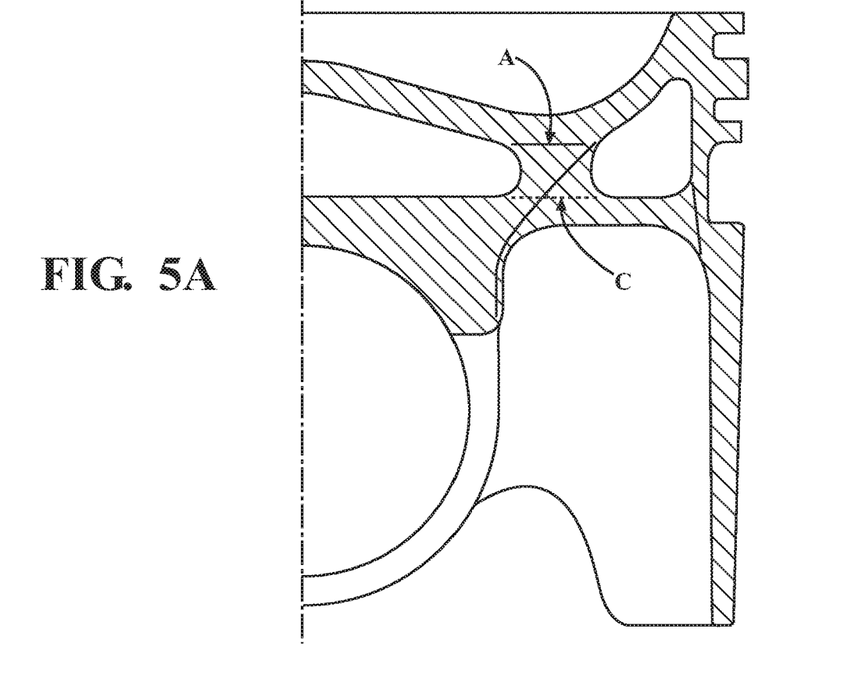
FIG. 5A illustrates the AMPS GEN3 piston illustrating changes implemented to achieve a galleryless steel piston according to an embodiment of the invention, wherein interrupted line C represents a whole planar structure to be moved upwards to plane A, and the hashed marks depict a material section to be removed except over the pin bosses.
Figure 5B:
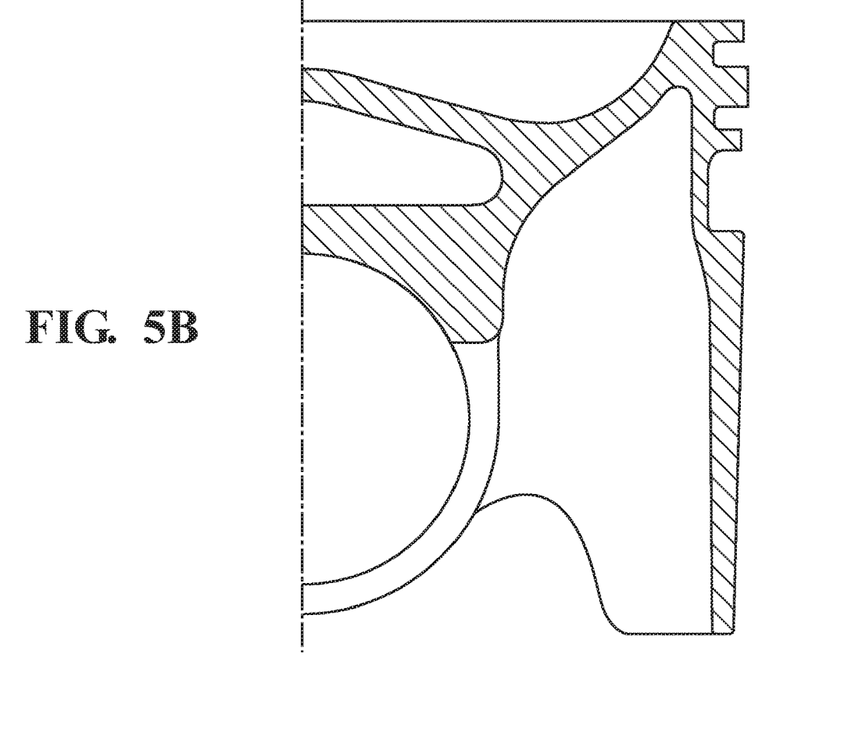
FIG. 5B illustrates the galleryless piston according to an embodiment of the invention after the changes shown in FIG. 5A are implemented.
Figure 6:
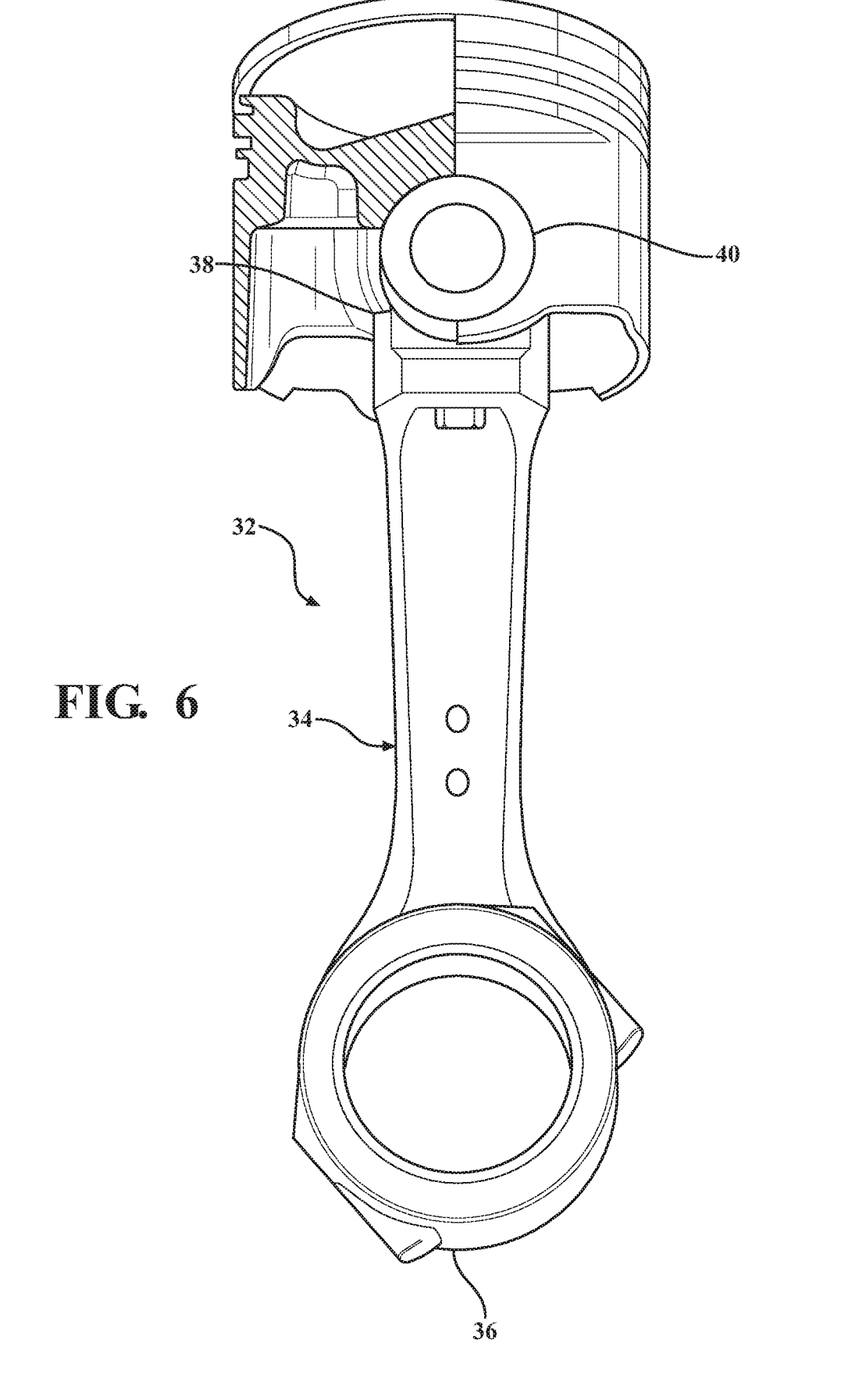
FIG. 6 is an example of a system including the galleryless piston used with an improved connecting rod and wrist pin design according to an example embodiment of the invention.
Figure 7:
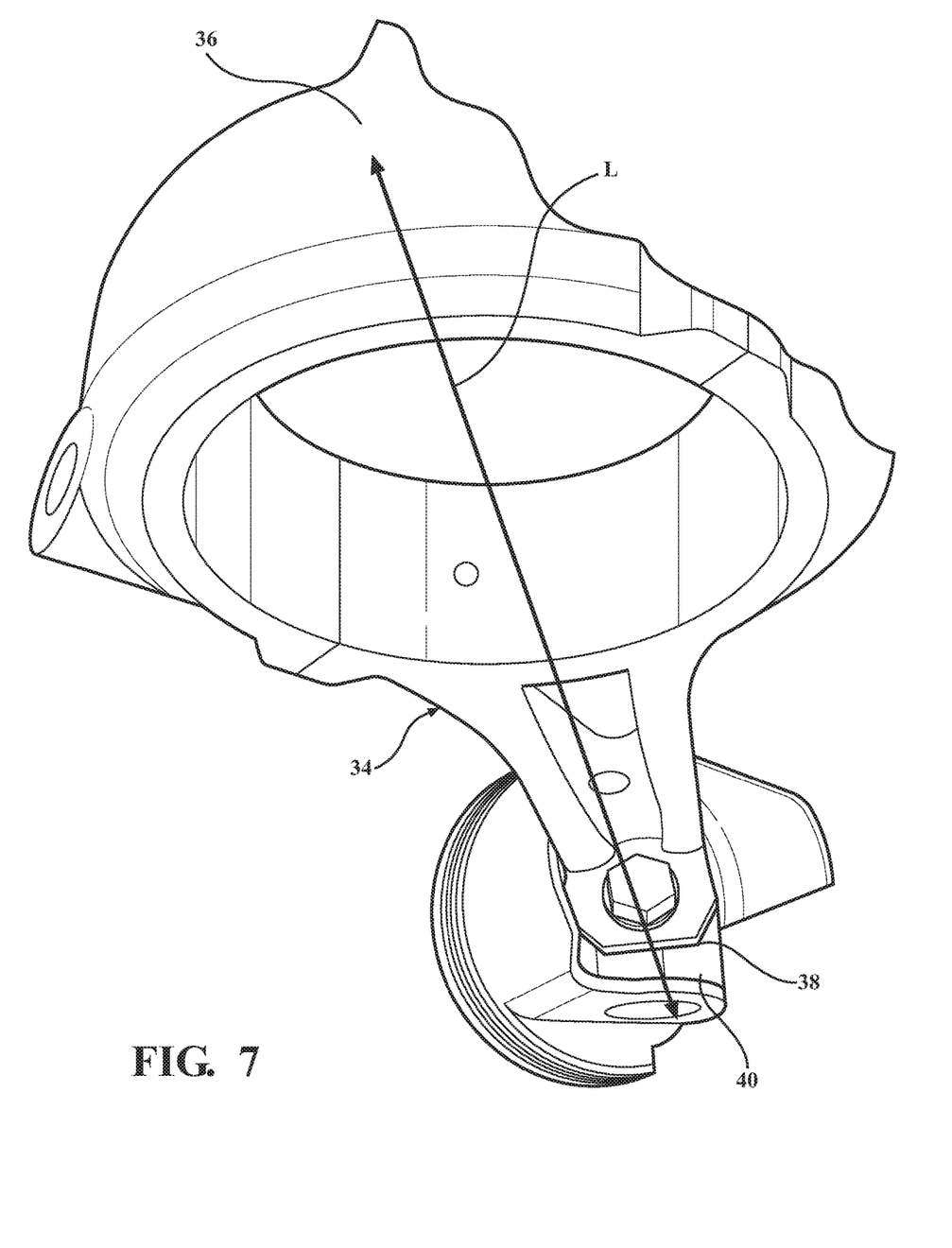
FIG. 7 is a bottom perspective view of the assembly of FIG. 6.
Figure 8:
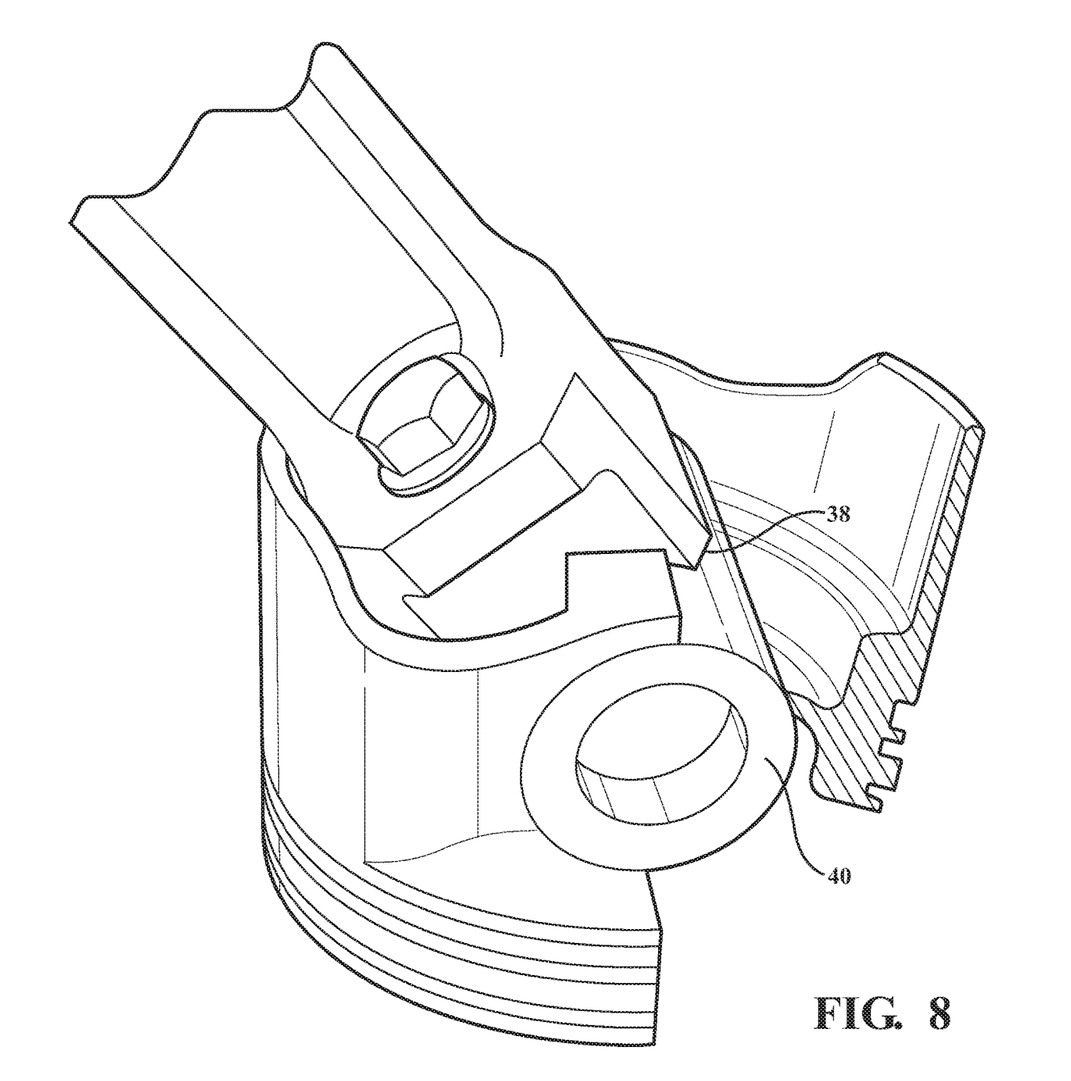
FIG. 8 is a partially sectioned perspective view of a small end of the connecting rod shown bolted to a wrist pin of the assembly of FIG. 6.
Figure 9:
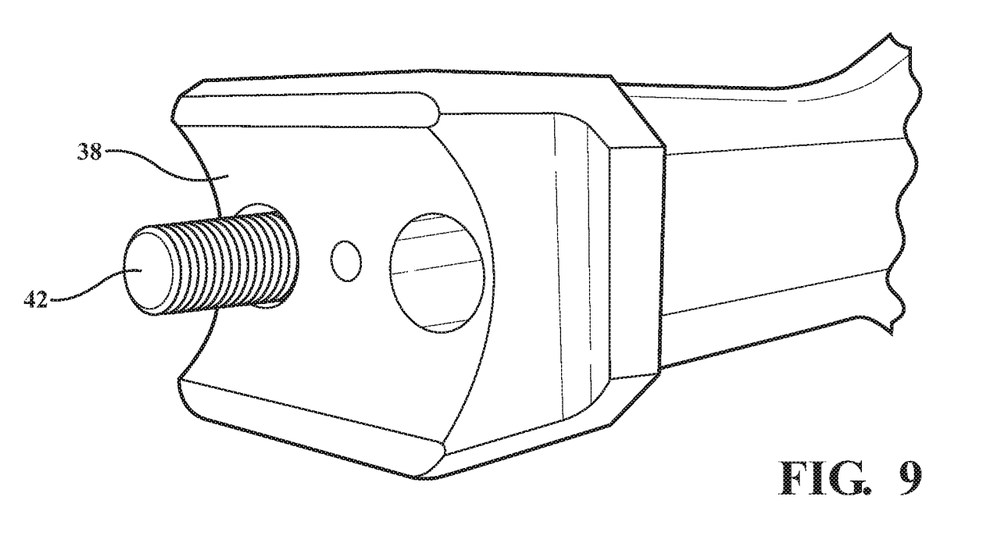
FIG. 9 is a perspective view of the small end of the connecting rod of the assembly of FIG. 6.

FIGS. 1, 2, and 5 illustrate a galleryless steel pistons 10, referred to as an AMPS GEN4 piston, constructed in accordance with exemplary embodiments of the invention for reciprocating movement in a cylinder bore or chamber (not shown) of a diesel engine. The piston 10 includes a low heat transfer coating 12, ribs 14, and a reduced compression height CH to achieve a smoother, quieter running engine. One of ordinary skill in the art understands that the compression height CH of the piston 10 is equal to the distance between a pin bore axis A and the uppermost surface of the piston, referred to as a combustion surface 18 of the piston 10.

The galleryless steel piston 10 typically includes a single-piece body formed from metal material, such as steel. The body can be formed by machining, forging or casting, with possible finish machining performed thereafter, if desired, to complete construction. The piston 10 is galleryless, meaning that it does not have a cooling gallery floor or other features creating a sealed or enclosed cooling gallery. A bottom view of the galleryless piston 10 according to one example embodiment is shown in FIG. 1, a side cross-sectional view of the galleryless piston 10 according to another example embodiment is shown in FIG. 2A, and a perspective cross-sectional view of the galleryless piston 10 according to yet another example embodiment is shown in FIG. 5B.

The body of the piston 10, being made of steel, is strong and durable to meet the high performance demands, i.e. increased temperature and compression loads, of modern day high performance internal combustion engines. The steel material used to construct the body can be an alloy such as the SAE 4140 grade or different, depending on the requirements of the piston 10 in the particular engine application. Due to the piston 10 being galleryless, the weight and compression height CH of the piston 10 is minimized, thereby allowing an engine in which the piston 10 is deployed to achieve a reduced weight and to be made more compact. According to one embodiment, the compression height CH of the piston 10 is reduced by 20% to 45%, relative to the comparative pistons shown in FIGS. 3A-3D. Further yet, even though the piston 10 is galleryless, the piston 10 can be sufficiently cooled during use, primary due to the thermal barrier coating 12 and a standard oil jet sprayed onto the piston 10. Thus, the piston 10 can withstand the most severe operating temperatures, such as a temperature of 700° C. The piston 10 can be exposed to higher temperatures than the AMPS GEN3 piston, which can typically only withstand a temperature of 400° C.

The body portion of the piston 10 has an upper head or top section providing an upper crown 16. The upper crown 16 includes the combustion surface 18 that is directly exposed to combustion gasses of a combustion chamber contained within a cylinder bore of the internal combustion engine. In the example embodiment, the combustion surface 18 forms a combustion bowl, or a non-planar, concave, or undulating surface around a center axis. A ring belt 20 depends from the combustion surface 18 and extends circumferentially along an outer diameter D of the piston 10. The ring belt 20 includes a plurality of lands separated from one another by ring grooves. The ring grooves are designed to containing piston rings (not shown), including a Dykes ring.

As shown in FIGS. 1, 2, and 5, the piston 10 also includes pin bosses 30 depending from the ring belt 20. Each pin boss 30 defines a pin bore 24 extending continuously around the pin bore axis A for receiving a wrist pin. However, the pin bosses 30 do not extend continuously across the diameter D of the piston 10. Rather, the pin bosses 30 are only disposed at the outer periphery of the piston 10. More specifically, the pin bosses 30 are only located along a portion of an undercrown surface 28 adjacent the ring belt 20 of the piston 10. Thus, the pin bosses 30 are spaced from one another by an open area located along the undercrown surface 28.

According to one embodiment, the piston 10 has compression height CH ranging from 48.4 mm to 58 mm. The piston 10 also has a ratio of compression height CH to outer diameter D (CH/D) ranging from 34.8% to 42.0%. If the outer diameter D of the piston 10 varies along the length of the piston 10, then the outer diameter D of the piston 10 for purposes of calculating CH/D is the largest diameter measured along the outermost surface of the piston 10. According to one example embodiment, the outer diameter D of the piston 10 is 139.0 mm, the compression height CH is 50.4 mm, and the CH/D is 36.3%.

To transfer gas pressure loads, the galleryless piston 10 is designed with a saddle 22 depending from the undercrown surface 28 of the upper crown 16 between the pin bosses 30. In one embodiment, the saddle 22 extends continuously between the opposing pin bosses 30. The saddle 22 together with the pin bosses 30 present a corresponding pin bore geometry for receiving the wrist pin. The saddle 22 only extends partially around the pin bore axis A to define an upper portion of the pin bores 24, which contributes to the reduced weight of the piston 10. In the example embodiment, the saddle 22 includes a pair of extensions depending from the undercrown surface 28 and each presenting a round surface matching the round surface of the pin bores 24 of the pin bosses 30. In other words, each extension of the saddle 22 presents an inverted U-shape. The wrist pin received in the pin bore 24 of the piston 10 is typically cantilevered at each pin bore 24. The saddle 22 bridges the gap between the two pin bosses 30. Due to the inverted U-shape of the saddle 22, the saddle 22 acts as a structural beam resisting the bending along the pin bore axis A due to gas pressure forces. According to one example embodiment, a distance d between the combustion surface 18 and a base of the saddle 22 ranges from 48 mm to 51 mm. In this case, a ratio of the distance d to the outer diameter (d/D) ranges from 34.8% to 36.7%. As shown in FIG. 2A, the base of the saddle 22 is located at the center of the round surface of the extensions of the saddle 22.

The piston 10 also includes a pair of skirt panels 26 depending from the ring belt 20 and located diametrically opposite one another. In the example embodiments, the skirt panels 26 create a light tubular structure extending downward from the upper crown 16. Thus, the skirt panels 26 are fabricated as one integral piece with the remaining sections of the piston body. In the example embodiments, the skirt panels 26 project inwardly where they unite with the lower portions of the pin bosses 30 to provide, from a bottom view, a pair of generally C-shaped tubular walls projecting from the pin bosses 30 on opposite sides of the pin bore 24. The entire body of the piston 10, including the skirt panels 26 is typically forged or cast as a single piece, with the skirt panels 26, to form a monolithic or "Monobloc" body.

The undercrown surface 28 of the piston 10 of FIG. 1 is formed on an underside of the upper crown 12, directly opposite the combustion surface 18 and radially inwardly of the ring belt 20. The undercrown surface 28 is the surface on the direct opposite side from the combustion bowl. The undercrown surface 28 is defined here to be the surface that is visible, when observing the piston 10 straight on from the bottom. The undercrown surface 28 is also openly exposed, as viewed from an underside of the piston 10, and it is not bounded by a sealed or enclosed cooling gallery.

In other words, when looking at the piston 10 from the bottom, the surface that presents itself is the undercrown surface 28 of the upper crown 16 and not, for example, a floor of a cooling gallery. Since the piston 10 is "galleryless," the bottoms of the upper cavities directly exposed to the undercrown surface 28 are uncovered and open from below. Unlike traditional gallery style pistons, the present piston 10 lacks bottom floors or ledges that would normally serve to entrap a certain amount of cooling oil in the region or space immediately below the undercrown surface 28. To the contrary, the undercrown surface 28 of the present piston 10 is intentionally and fully open, and the exposure thereof is maximized.

The undercrown surface 28 of the piston 10 has greater a total surface area (3-dimensional area following the contour of the surface) and a greater projected surface area (2-dimensional area, planar, as seen in plan view) than comparative pistons having a sealed or enclosed cooling gallery. According to one embodiment, the 3-dimensional surface area of the undercrown surface 28 located below the pin bore axis A of the piston 10 is 26038.9 $mm^2$, and the 2-dimensional or projected surface area of the undercrown surface 28 located below the pin bore axis A of the piston 10 is 8334.72 $mm^2$. However, these surface areas could vary with piston diameters and detail design as required by each engine. The surface area of the undercrown surface 28 is typically 20% to 54% greater than the undercrown surface area of an AMPS GEN3 piston.

This open region along the underside of the piston 10 provides direct access to oil splashing or being sprayed from within a crankcase directly onto the undercrown surface 28, thereby allowing the entire undercrown surface 28 to be splashed directly by oil from within the crankcase, while also allowing the oil to freely splash about the wrist pin and further, significantly reduce the weight of the piston 10. Accordingly, although not having a typical closed or partially closed cooling gallery, the generally open configuration of the galleryless piston 10 allows optimal cooling of the undercrown surface 28 and lubrication to the wrist pin within the pin bores 24, while at the same time reducing oil residence time on the surfaces near the combustion bowl, which is the time in which a volume of oil remains on the surface. The 2-dimensional and 3-dimensional surface area of the undercrown surface 28 is typically maximized so that cooling caused by oil splashing or being sprayed upwardly from the crankcase against the exposed surface can be enhanced, thereby lending to exceptional cooling of the piston 10.

The low heat transfer coating 12 is applied to the combustion surface 18, as shown in FIGS. 2A and 2B, to act as a heat shield and insulate the piston 10 from hot combustion gases, reduce heat transfer through the piston body, and thus provide a lower temperature along the ring belt 20 and the undercrown surface 28. The low heat transfer coating 12 also maintains heat in the combustion chamber of the engine, thus improving the efficiency and quality of the ignition of combustion gases. For example, the ignition delay can be significantly reduced by a factor of three. According to one embodiment, the ignition delay is reduced by 4 to 10 milliseconds. In this case, the ignition begins when the crank angle is 2 to 5 degrees from top dead center. Due to the reduced ignition delay, the hot combustion gases spend less time in the cylinder, waste heat recovery is improved, and heat stays in the exhaust system longer. Due to the low heat transfer coating 12, an undercrown gallery for purposes of cooling the piston 10 is no longer required, and the undercrown features of the piston 10 are only for structural support.

The low heat transfer coating 12 is also referred to as an adiabatic coating. The low heat transfer coating 12 includes an insulating or thermal barrier layer and typically further includes a catalytic or refractory layer. Alternatively, the insulating layer of the low heat transfer coating 12 can be infused with catalytic action characteristics. The total thickness of the low heat transfer coating 12, including the insulating layer and any catalytic layer, is typically from 0.2 to 0.5 mm. The low heat transfer coating 12 also preferably has a heat transfer coefficient, also referred to as thermal conductivity, of about 0.20 to 0.80 W/m·K.

Various different compositions can be used for the low heat transfer coating 12. According to one example embodiment, the insulating layer of the low heat transfer coating 12 includes cerium stabilized zirconia. However, other or additional elements or compounds providing insulation could be used as the insulating layer. The catalytic portion or layer of the low heat transfer coating 12 can include electroplated or infused rhodium, platinum, palladium, or a combination thereof. In addition, the previously mentioned elements can be used with other compounds known to exert a catalytic action at low temperatures, as low as 470 to 500 K.

All features of the piston 10 described herein are typically in support and/or derived from the low heat transfer coating 12 with the addition of the catalytic elements. The presence of such catalytic action should shorten the pre-mixed period of the combustion process through reduction of the unburned fuel quantity present in the combustion chamber. Automatically, this reduces the combustion-derived knock, allows control of the combustion process by the injection equipment (diffusion process) and ultimately limiting peak pressure. All of this should enhance thermal efficiency; reduce noise, vibration, and harshness (NVH); and provide high quality exhaust energy for Waste Heat Recovery (WHR) systems downstream of the engine.

In some cases, it is necessary to seal the insulating layer of the low heat transfer coating 12 and make the insulating layer electrically conductive. In this case, a sealant layer composed of nickel or compounds of nickel could be used to provide the seal and electrical conductivity. The catalytic layer can then be applied on top of the sealant layer.

The catalytic layer or portion embedded in the low heat transfer coating 12 provides a shorter to negligible ignition delay, typically lower than 0.04 to 1.0 milliseconds. Therefore, combustion will proceed mostly through a diffusion process, under full control of the injection system electronic control unit. This reduces combustion roughness and peak pressure, which occurs because of negligible to minimum pre-mixed combustion burning, the true source of combustion process pulses.

Due to the inherent brittleness of the low heat transfer coating 12, the upper crown 16 must be rigid to avoid tensile stress acting on the low heat transfer coating 12 itself. Thus, the unsupported areas of the undercrown surface 28 include the ribs 14, as shown in FIG. 1, to provide the increased structural support and rigidity, or increased section modulus (solid mechanics). Those of skill in the art will recognize the increased strength provided by the ribs 14 after reviewing a cross-section of the piston 10 along the thrust-non thrust plane. In the piston 10 of the example embodiment of FIG. 1, a pair of the ribs 14 extends from each extension of the saddle 22 to the ring belt 20. In this case, the ribs 14 extend from opposite sides of the pin bores 24 of the saddle 22 toward the ring belt 20. Each rib 14 converges toward another one of the other ribs 14 extending from the other extension, and the two ribs 14 meet at the ring belt 20. The piston 10 also includes a pair of the ribs 14 extending along the pin bore axis A. The ribs 14 are designed in to limit deflection of the upper crown 16.

FIG. 5A illustrates the AMPS GEN3 piston illustrating changes implemented to achieve the galleryless steel piston 10 of the present invention, wherein interrupted line C represents a whole planar structure to be moved upwards to plane A. The hashed marks depict a material section to be removed except over the pin bores 24. In its place, the ribs 14 are designed in to limit deflection of the upper crown 16. FIG. 5B illustrates the galleryless piston 10 according to an example embodiment after the changes of FIG. 5A are complete.

The galleryless steel piston 10 also is preferably used with an improved connecting rod design, which in combination with the reduced compression height CH, saddle 22, and open galleryless design, contributes to the reduced weight of the piston 10. For example, the apparent weight of the galleryless steel piston 10 of the example embodiment can be reduced by as much as 28% compared to the Monosteel®, AMPS GEN1, and AMPS GEN3 pistons. In addition, the compression height CH of the example piston 10 is 51.5 mm, which is reduced compared to the compression height CH of the Monosteel® piston, which is 81.5 mm. The compression height CH of the piston 10 is also reduced compared to the compression height CH of the AMPS GEN1 and AMPS GEN3 pistons, which both have a compression height CH of 58.5 mm. An example of the improved connecting rod design with the AMPS GEN3 pistons is disclosed in U.S. Pat. No. 9,127,618, except for the pistons disclosed in the '618 patent should be replaced with the piston 10 of the subject invention, as described herein. The disclosure of the '618 patent is incorporated herein by reference.

As shown in FIGS. 6-10 and described in U.S. Pat. No. 9,127,618, the connecting rod design 32 according to an example embodiment includes a connecting rod 34 extending over a length between a large end 36 with a bore that is configured for coupling to a journal of a crankshaft (not shown) and an opposite small end 38 that is configured for fixed attachment to the wrist pin 40. In the example embodiment shown in FIG. 9, the opposite end 38 has a symmetrical flange with a pair of through openings configured for alignment with threaded openings in the wrist pin 40. With the through openings aligned with the threaded openings, fasteners 42 are inserted through the through openings and threaded into the threaded openings to fix the connecting rod 34 to the wrist pin 40. The connecting rod 34 can have an oil passage extending over its length from the bore of the large end 36 through the flange of the opposite end 38. The oil passage is aligned with the through hole in the wrist pin 40, and as such, allows oil to flow freely through the connecting rod 34 into the wrist pin 40 to facilitate removing heat generated in the region of the wrist pin 40 and the floor of the piston 10, while also providing lubrication to the uppermost surface of the pin bore 24, thereby eliminating any dry regions between the wrist pin 40 and pin bearing surfaces.

Figure 10:
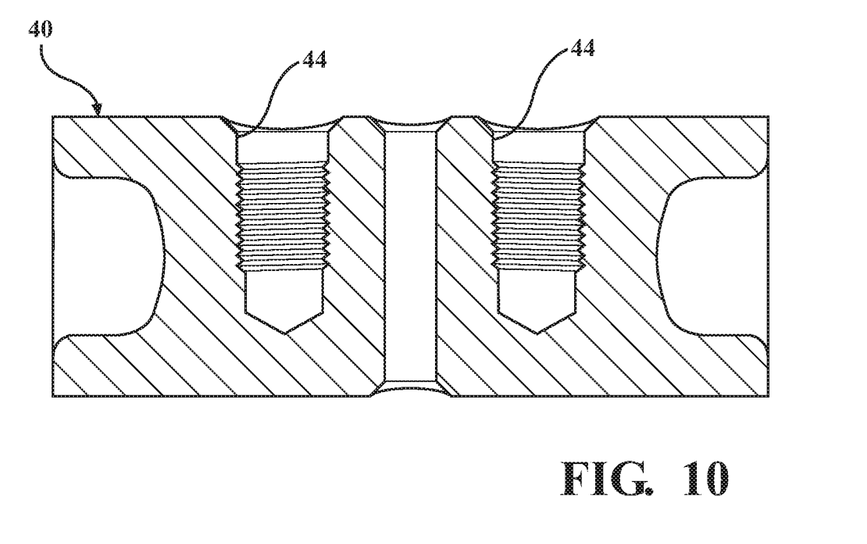
FIG. 10 is a cross-sectional side view of the wrist pin of the assembly of FIG. 6.

As shown in FIG. 10, according to the example embodiment, the wrist pin 40 has at least one, and shown as a pair of threaded openings 44 for receipt of the fasteners 42 to fix the connecting rod 34 to the wrist pin 40. Accordingly, the wrist pin 40 and the connecting rod 34 are fixed to one another with limited relative movement. For example, the wrist pin 40 typically rotates no more than 15 degrees each direction. The wrist pin 40 further includes opposite ends having recesses extending therein, thus, further reducing the weight of the entire assembly and moment of inertia thereof in use. Further contributing to a weight reduction is a through hole extending between the threaded openings. The through hole allows oil to flow there through, thus, enhancing cooling and lubrication of the wrist pin 40 in use. Further yet, with the full length of the wrist pin 40 bearing against the uppermost surface of the pin bores 24 and the saddle 22, the diameter of the wrist pin 40 can be substantially reduced, as the wrist pin 40 is supported over its full length and not in cantilevered fashion. Accordingly, the reduction in diameter of the wrist pin 40 further reduces the weight of the assembly, while at the same time being able to withstand increased firing pressures relative to conventional cantilevered wrist pin designs.

The compression height CH of the galleryless steel piston 10 according to some embodiments of the invention is expected to be about 51.5 millimeters, or 37% shorter than the Monosteel® piston. The compression height CH of the galleryless steel piston 10 is also expected to be up to 14% shorter than the AMPS GEN3 piston. As indicated above, the reduced compression height CH makes the galleryless steel piston 10 considerable lighter, which contributes to the improved performance. The weight of the galleryless steel piston 10 of the example embodiments is about 72% of the weight of the Monosteel® piston and about 9% lighter compared to the weight of the AMPS GEN3 piston.

The pin bore axis A, also referred to as an oscillation axis, of the galleryless steel piston 10 is located closer to the center of mass of the piston 10, which allows the connecting rod length to be up to 11-12% longer. For example, the connecting rod 34 can have a length L extending from one end to the opposite end, of 301 mm to 311 mm, which is 3 mm longer than the longest connecting rod used with the comparative AMPS pistons. According to one embodiment, the ratio of the compression height CH to the length L of the connecting rod 34 (CH/L) is 15.5 to 19.4. The longer connecting rod 34 contributes to improved efficiency of the engine. The longer connecting rod 34 also allows the piston 10 to move slower relative to the top dead center position and thus is subjected to less friction due to engagement with the cylinder wall.

The wrist pin used with the galleryless steel piston 10 will be located upwards by the same amount, about 7 millimeters or 8.6% of the Monosteel® compression height CH, and the connecting rod has to be similarly extended. The connecting rod used with the galleryless steel piston 10 has a center-to-center length of up to 11% longer than a standard connecting rod and 2% to 2.5% longer than the connecting rod of the AMPS pistons.

Figure 3A:
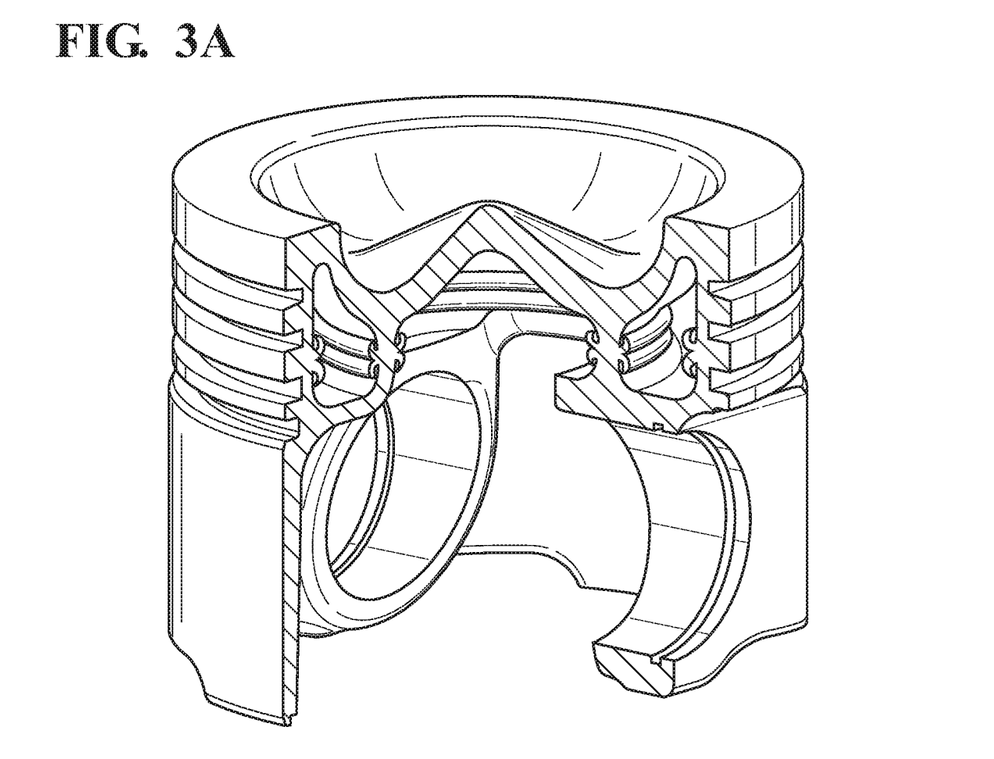
FIG. 3A illustrates a comparative piston referred to as a Monosteel® piston.
Figure 3B:
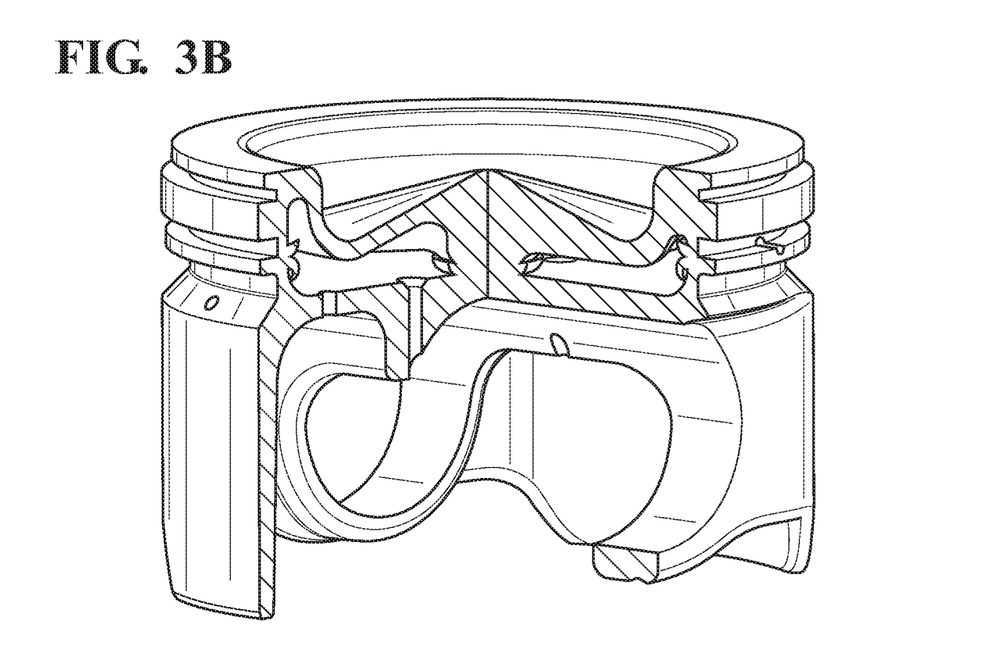
FIG. 3B is a perspective cross-sectional view of another comparative piston referred to as an AMPS GEN1 piston.
Figure 3C:
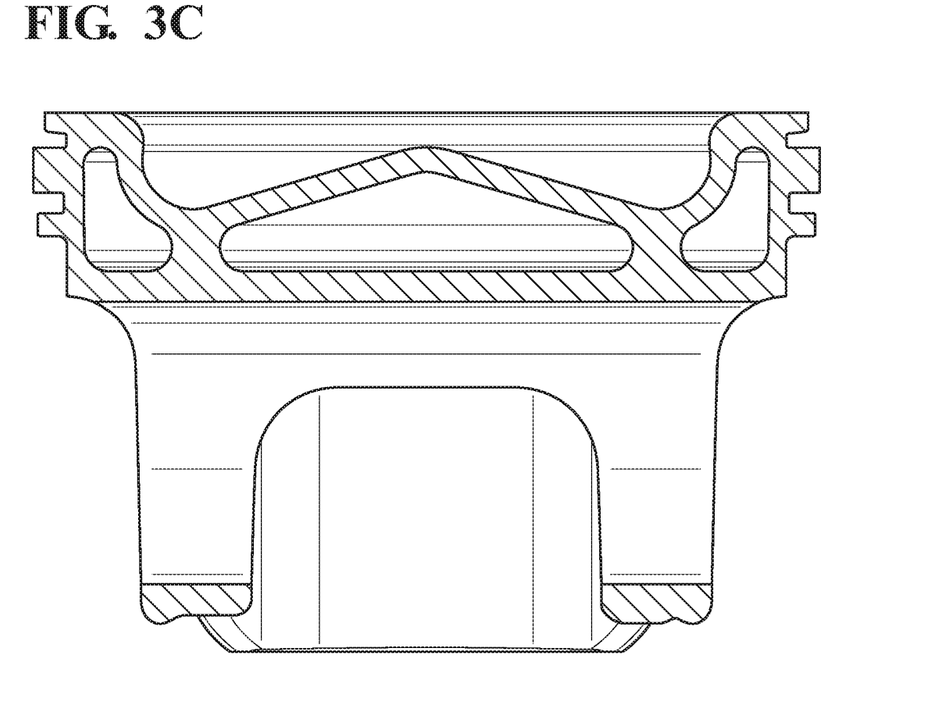
FIG. 3C is a front cross-sectional view and FIG. 3D is a side cross-sectional view of another comparative piston referred to as an AMPS GEN3 piston.
Figure 3D:
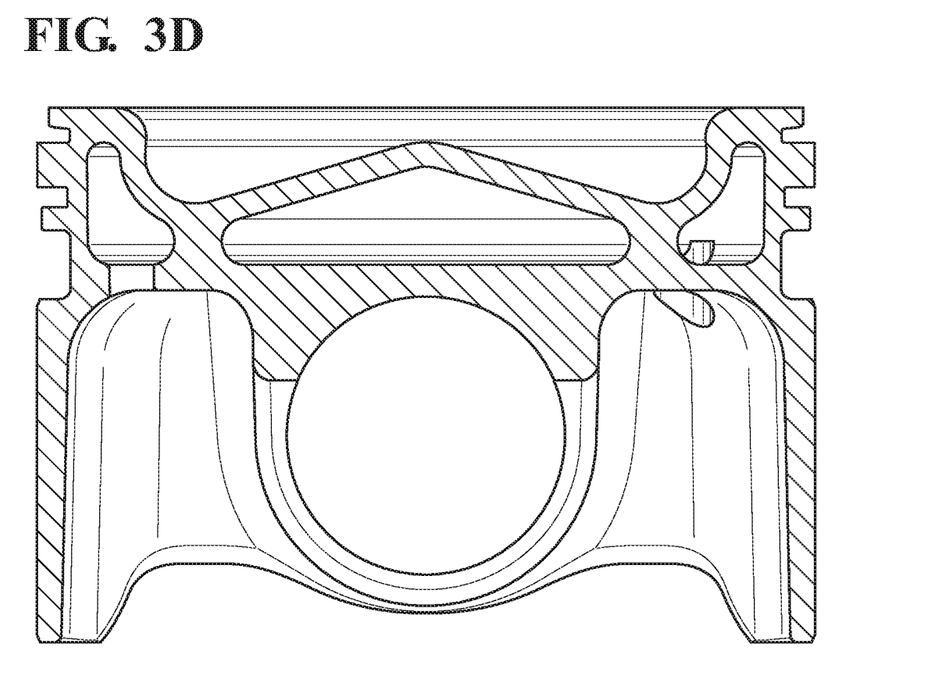
Figure 3E:
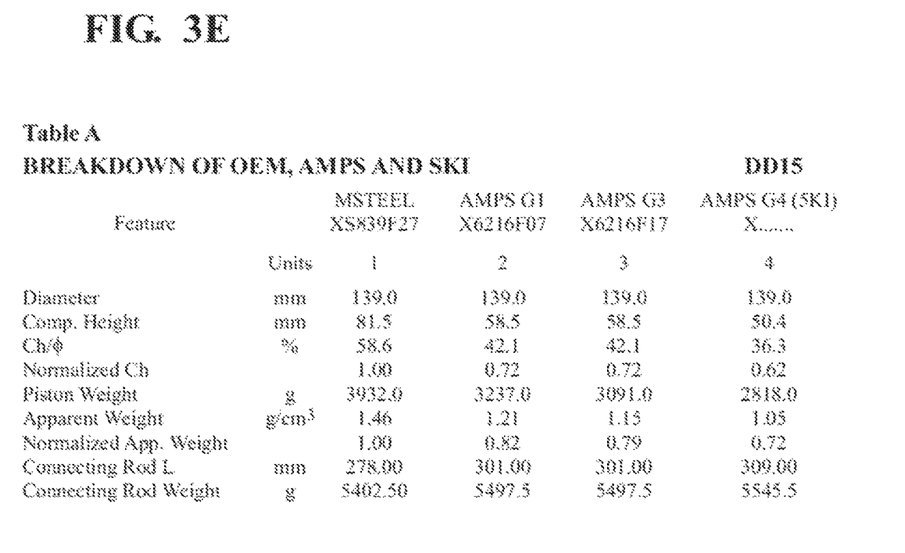
FIG. 3E includes a table listing normalized compression height, normalized apparent weight, and other features of the galleryless steel piston of FIG. 1 relative to the comparative pistons.
Figure 3F:
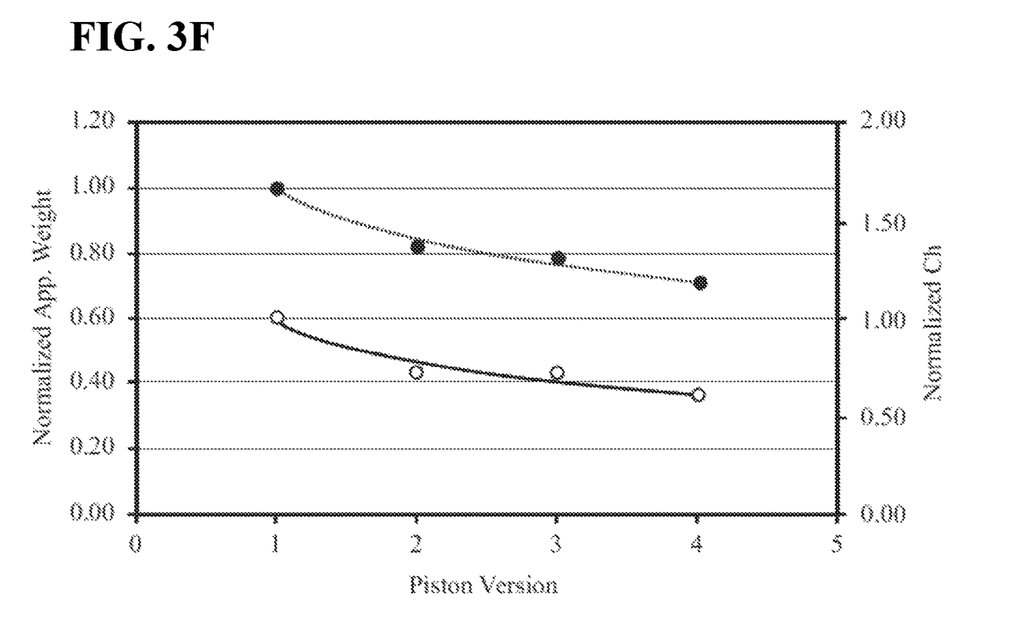
FIG. 3F includes a chart illustrating normalized compression height and normalized apparent weight of the galleryless steel piston of FIG. 1 relative to the comparative pistons.
Figure 4A:
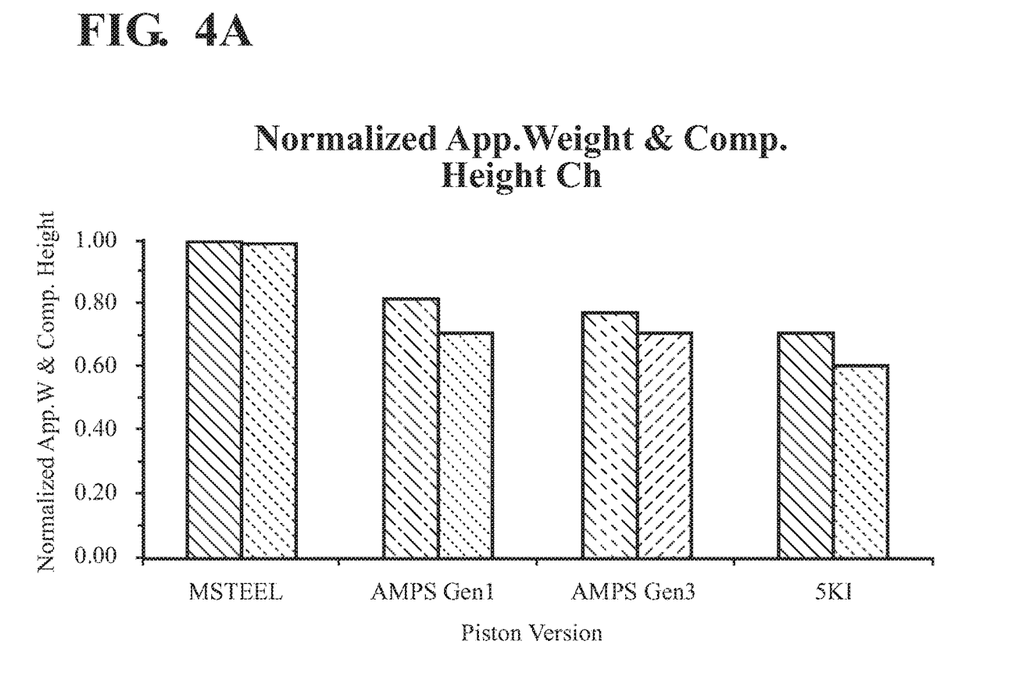
FIGS. 4A and 4B each include a chart illustrating normalized compression height and normalized apparent weight of the galleryless steel piston of FIG. 1 relative to the comparative pistons.
Figure 4B:
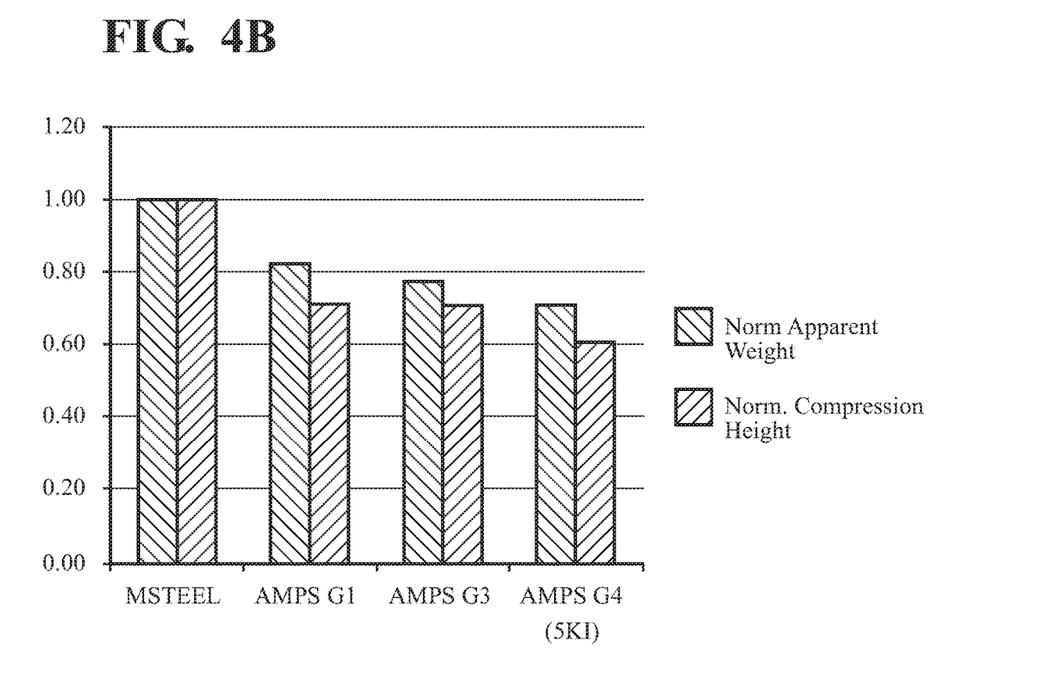

FIG. 3E includes a table and chart illustrating the normalized compression height CH and normalized apparent weight of the example galleryless steel piston 10 of FIG. 1 relative to comparative pistons, including the Monosteel® piston, AMPS GEN1 piston, and AMPS GEN3 piston. FIG. 4 includes two additional charts illustrating the normalized compression height CH and normalized apparent weight of the galleryless steel piston 10 of FIG. 1 relative to the comparative pistons.

As indicated above, the galleryless steel piston 10 circumvents the aforementioned negatives encountered by the other pistons, for example providing reduced piston slap, resulting in a smoother, quieter running engine, i.e. lower noise, vibration, and harshness (NVH). The galleryless steel piston 10 also provides higher thermal efficiency, due to lower heat and friction losses derived from the low heat transfer coating 12 and longer connecting rod 34, and consequently reduced fuel consumption. For example, the fuel consumption can be reduced by 5% to 10%. If combined heat and power schemes are contemplated, the expected higher exhaust temperatures can be used to good effect. More specifically, the improved system, which includes the piston 10, connecting rod 34, and wrist pin 40, provides for more heat and exhaust gas in the combustion chamber. The abundance of heat provides for an increase in waste heat recovery of 2% to 5%. The piston 10 design also contributes to the improved engine efficiency, typically 5% to 10%, such that the thermal brake efficiency of the engine is improved by 7% to 15%, compared to systems including one of the AMPS pistons.

Obviously, many modifications and variations of the present invention are possible in light of the above teachings and may be practiced otherwise than as specifically described while within the scope of the invention. It is contemplated that all features described and all embodiments can be combined with each other, so long as such combinations would not contradict one another.

What is claimed is:

1. A piston, comprising:
   a body formed of steel,
   said body including an upper crown presenting a combustion surface for exposure to a combustion chamber,
   said upper crown presenting an undercrown surface disposed opposite said combustion surface,
   said undercrown surface being openly exposed as viewed from an underside of the piston and not bounded by a cooling gallery
   said body including a ring belt depending from said combustion surface,
   said body including pin bosses depending from said ring belt and presenting a pin bore for receiving a wrist pin,
   said body including ribs disposed along said undercrown surface,
   said body including a ratio of compression height to outer diameter (CH/D) ranging from 34.8% to 42.0%,
   said compression height being equal to a distance between a pin bore axis of said pin bore and said combustion surface,
   said outer diameter being the largest outer diameter of said body,
   a low heat transfer coating disposed on said combustion surface, and
   said low heat transfer coating having a thermal conductivity of about 0.20 to 0.80 W/m·K.

2. The piston of claim 1, wherein said pin bosses are disposed at an outer periphery of said piston and spaced from one another by an open area located along said undercrown surface.

3. The piston of claim 1, wherein said compression height ranges from 48.4 mm to 58 mm.

4. The piston of claim 1 including a saddle depending from said undercrown surface of said upper crown between said pin bosses, and said saddle extending partially around said pin bore axis.

5. The piston of claim 4, wherein said saddle includes a pair of extensions depending from said undercrown surface, and each extension presents a round surface matching a round surface of said pin bore.

6. The piston of claim 5, wherein a distance (d) between said combustion surface and a base of said saddle ranges from 48 mm to 51 mm, said base of said saddle is located at the center of said round surface.

7. The piston of claim 6, wherein a ratio of said distance between said combustion surface and said base of said saddle to said outer diameter of said piston (d/D) ranges from 34.8% to 36.7%.

8. The piston of claim 5, wherein a pair of said ribs extend from each extension of said saddle to said ring belt, two of said ribs extend from opposite sides of said pin bore of one of said extensions of said saddle toward said ring belt, two of said ribs extend from opposite sides of said pin bore of the other one of said extensions of said saddle toward said ring belt, and each rib converges toward another one of said ribs extending from the other extension.

9. The piston of claim 1, wherein a pair of said ribs extend along said pin bore axis.

10. The piston of claim 1 including skirt panels depending from said ring belt and located diametrically opposite one another, and said skirt panels are fabricated as one integral piece with the remaining sections of said piston body.

11. The piston of claim 1, wherein said body of said piston is a single piece.

12. The piston of claim 1, wherein said low heat transfer coating includes an insulating layer and a catalytic layer, and said low heat transfer coating has a total thickness of from 0.2 mm to 0.5 mm.

13. The piston of claim 1, wherein said low heat transfer coating includes an insulating layer including cerium stabilized zirconia, and a catalytic portion or layer including rhodium, platinum, palladium, or a combination thereof.

14. The piston of claim 1, wherein said low heat transfer coating includes an insulating layer, a sealant layer disposed on said insulating layer, and a catalytic layer disposed on said sealant layer.

15. A method of manufacturing a piston, comprising the steps of:
   providing a body formed of steel, the body including an upper crown presenting a combustion surface for exposure to a combustion chamber, the upper crown presenting an undercrown surface disposed opposite the combustion surface, the undercrown surface being openly exposed as viewed from an underside of the piston and not bounded by a cooling gallery, the body including a ring belt depending from the combustion surface, the body including pin bosses depending from the ring belt and presenting a pin bore for receiving a wrist pin, the body including ribs disposed along the undercrown surface, the body including a ratio of compression height to outer diameter (CH/D) ranging from 34.8% to 42.0%, the compression height being equal to a distance between a pin bore axis of the pin bore and the combustion surface, the outer diameter being the largest outer diameter of the body, and
   applying a low heat transfer coating on the combustion surface, the low heat transfer coating having a thermal conductivity of about 0.20 to 0.80 W/m·K.

16. A piston assembly, comprising:
a connecting rod extending over a length from a large end with a first bore for coupling to a journal of a crankshaft to an opposite small end,
a piston including a body formed of steel,
said body including an upper crown presenting a combustion surface for exposure to a combustion chamber,
said upper crown presenting an undercrown surface disposed opposite said combustion surface,
said undercrown surface being openly exposed as viewed from an underside of said piston and not bounded by a cooling gallery,
said body including a ring belt depending from said combustion surface,
said body including pin bosses depending from said ring belt and presenting a pin bore,
said body including ribs disposed along said undercrown surface,
said body including a ratio of compression height to outer diameter (CH/D) ranging from 34.8% to 42.0%,
said compression height being equal to a distance between a pin bore axis of said pin bore and said combustion surface,
said outer diameter being the largest outer diameter of said body,
a low heat transfer coating disposed on said combustion surface,
said low heat transfer coating having a thermal conductivity of about 0.20 to 0.80 W/m·K, and
a wrist pin received in said pin bore of said piston and attached to said small end of said connecting rod.

17. The assembly of claim 16, wherein a ratio of said compression height of said piston to said length of said connecting rod (CH/L) is 15.5 to 19.4.

18. The assembly of claim 16, wherein said connecting rod includes an oil passage extending over said length, said wrist pin and said connecting rod are fixed to one another by fasteners, said wrist pin is rotatable no more than 15 degrees in each direction, said wrist pin includes opposite ends with recesses extending therein, and said wrist pin includes a through hole allowing oil to flow therein.

19. The assembly of claim 16, wherein said length of said connecting rod is from 301 mm to 311 mm.

20. A method of manufacturing a piston assembly, comprising the steps of:
providing a connecting rod extending over a length from a large end with a first bore for coupling to a journal of a crankshaft to an opposite small end,
providing a piston including a body formed of steel, the body including an upper crown presenting a combustion surface for exposure to a combustion chamber, the upper crown presenting an undercrown surface disposed opposite the combustion surface, the undercrown surface being openly exposed as viewed from an underside of the piston and not bounded by a cooling gallery, the body including a ring belt depending from the combustion surface, the body including pin bosses depending from the ring belt and presenting a pin bore, the body including ribs disposed along the undercrown surface, the body including a ratio of compression height to outer diameter (CH/D) ranging from 34.8% to 42.0%, the compression height being equal to a distance between a pin bore axis of the pin bore and the combustion surface, the outer diameter being the largest outer diameter of the body, the piston including a low heat transfer coating disposed on the combustion surface, the low heat transfer coating having a thermal conductivity of about 0.20 to 0.80 W/m·K,
disposing a wrist pin in the pin bore of the piston, and
attaching the wrist pin to the small end of the connecting rod.

* * * * *